United States Patent [19]

Little et al.

[11] Patent Number: 4,547,665
[45] Date of Patent: Oct. 15, 1985

[54] FIBER OPTIC POSITION SENSOR

[75] Inventors: William R. Little, Seattle; Ted M. Daniels, Edmonds, both of Wash.

[73] Assignee: Eldec Corporation, Lynnwood, Wash.

[21] Appl. No.: 453,488

[22] Filed: Dec. 27, 1982

[51] Int. Cl.⁴ .............................................. G01D 5/34
[52] U.S. Cl. .............................. 250/227; 250/231 SE
[58] Field of Search ............ 250/231 R, 231 SE, 227; 350/293, 96.15, 96.16, 96.10; 33/1 L

[56] References Cited

U.S. PATENT DOCUMENTS 4,275,966 6/1981 Kleesattel ............................ 356/387
4,447,118 5/1984 Mulkey ............................ 350/96.16

Primary Examiner—David C. Nelms
Assistant Examiner—J. Jon Brophy
Attorney, Agent, or Firm—Christensen, O'Connor, Johnson & Kindness

[57] ABSTRACT

A fiber optic sensor for determining the position of a shaft 10 that is supported by a bearing 12 includes a sensor circuit 14 and at least one fiber 16 that extends from the sensor circuit to a point proximate but slightly separated from the shaft surface, with a portion of the optical fiber extending through and being carried by the bearing. Target areas 18, 20 and 22 are located on shaft 10 so as to correspond to the positions to be determined. Each target area consists of an angled recess that is constructed and arranged, relative to the numerical aperture and orientation of the optical fiber, so as to substantially nonreflective insofar as the optical fiber is concerned, thus providing a sharp contrast to the highly reflective background of the shaft surface.

16 Claims, 6 Drawing Figures

FIBER OPTIC POSITION SENSOR

FIELD OF THE INVENTION

This invention generally relates to sensors including at least one optical fiber and more particularly to sensors of this type that are particularly adapted to determine the position of an object.

BACKGROUND OF THE INVENTION

There are many situations in which it is desired to determine the position of an object. A typical situation is that in which the object is a movable member of a mechanism, wherein it is desired to determine when the member has moved to a certain position. Quite often, such position determination is made by a proximity sensor that includes a target affixed or linked to the movable member and a proximity switch mounted at a reference position. The target and the proximity switch are constructed and arranged so that the proximity switch provides a switch actuation whenever the target is at a predetermined distance from the proximity switch.

It has been proposed to use a fiber optic sensor to provide position determination. Such a fiber optic sensor would include at least one optical fiber extending from a sensor circuit to the reference position, and a target that is capable of illumination by the optical fiber and that is either formed in, affixed to, or linked to the movable member. The target would be provided with target areas whose light reflectivity contrasts with that of the target background and which are appropriately located on the target so as to correspond to discrete positions of the movable member relative to the reference position. The sensor circuit may then transmit light to the target through the optical fiber and provide position determination by analyzing that portion of the transmitted light that is reflected by the target areas and their background to the sensor circuit through the optical fiber.

One of the requirements for a fiber optic sensor particularly adapted for position determination is that each target area, whether it be a "light" area of relatively high light reflectivity on a "dark" background of relatively low light reflectivity, or a dark area on a light background, must be well-defined in dimension and must have a light reflectivity that is and remains in sharp contrast to that of the target background. The present invention is specifically directed to meeting this requirement in the case where the target area is substantially nonreflective and the target background is highly reflective, and also meets other requirements of specific position determination applications as will be apparent from the ensuing discussion.

SUMMARY OF THE INVENTION

A fiber optic sensor constructed according to the teachings of the present invention comprises:

an elongated optical fiber having an end face, the optical fiber being characterized by a limiting angle $\alpha$ measured relative to the longitudinal axis of the optical fiber beyond which a light ray cannot exit or enter the end face and still be transmitted along the length of the optical fiber;

an object surface on the object whose position is to be determined, the object surface being reflective and remaining substantially perpendicular to the longitudinal axis of the optical fiber; and, a nonreflective target area located on the object surface so as to contrast therewith and correspond to the position to be determined, the target area consisting of a recess extending into the object from the object surface, the recess including first and second opposing surfaces that are substantially equally inclined from the object surface and that have an included angle $\theta$ between any two diametrically-opposed points thereon, where $90° + 2\alpha < \theta < 180° - 2\alpha$.

In the aforesaid construction, the target area will be substantially nonreflective insofar as the optical fiber is concerned, inasmuch as any light exiting the fiber and reflected back to the fiber by the recess will be incident upon the fiber end face at an angle greater than the limiting angle $\alpha$. Preferably, the included angle $\theta$ is substantially 135° and the limiting angle $\alpha$ is less than 22.5°. The recess may have a conical surface that can terminate in a central apex, or may be in the form of an elongated groove. In order to provide maximum contrast between the object surface and the target area, the object surface may be highly reflective. If the aforesaid construction is followed, the recess surface may also be highly reflective while yet being substantially nonreflective insofar as the optical fiber is concerned. Preferably, the maximum distance between two diametrically-opposed points on the recess surface, such as the largest diameter of the conical recess, is no less than the diameter of the optical fiber.

BRIEF DESCRIPTION OF THE DRAWINGS

The invention can best be understood by reference to the following portion of the specification, taken in conjunction with the accompanied drawings in which.

DESCRIPTION OF THE PREFERRED EMBODIMENT

Figure 1:
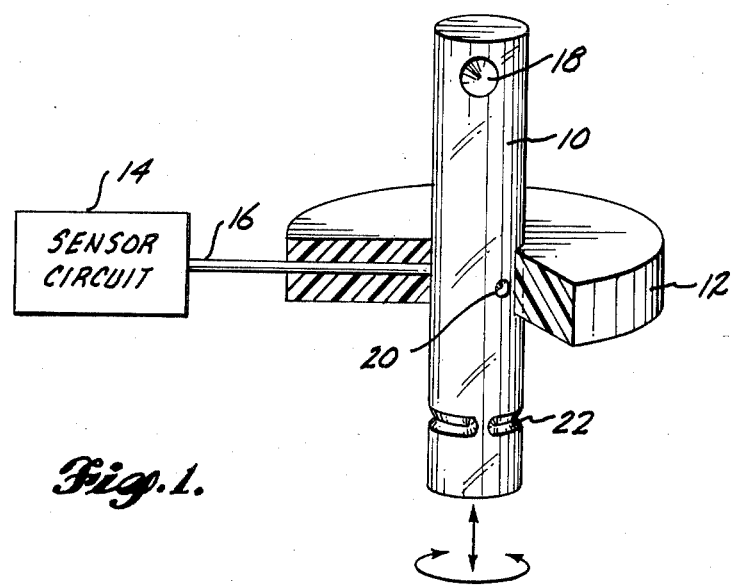
FIG. 1 illustrates a specific application of the fiber optic sensor for determining various positions of a shaft that is supported by and movable relative to a bearing.

Referring now to FIG. 1, the fiber optic sensor will be described in the case of a specific application for sensing various positions of a shaft 10 that is supported by and movable relative to a bearing 12. In this specific application, shaft 10 has a highly polished, chrome plated surface that is closely engaged by bearing 12 composed of a dry bearing material such as Teflon ᵀᴹ, and shaft 10 is capable of both translative and rotary movement relative to bearing 12. The fiber optic sensor includes a sensor circuit 14, at least one optical fiber 16, and target areas 18, 20 and 22 formed on the surface of shaft 10. Optical fiber 16 extends from sensor circuit 14 to a point proximate but slightly separated from the surface of shaft 10. A portion of optical fiber 16 extends through and is carried by bearing 12 so as to define a reference for position determination. Target areas 18, 20 and 22 are located on shaft 10 so as to correspond to the positions to be determined and are constructed and arranged so as to be substantially nonreflective to light exiting from optical fiber 16, thus providing a sharp contrast with the highly reflective background afforded by the polished and plated surface of shaft 10. Sensor circuit 14, which is of conventional design, is capable of transmitting and receiving light via optical fiber 16 and of analyzing the intensity of the received light to determine the position of shaft 10. Due to the structure that has been described, the intensity of the received light will have a relatively high value for all positions of shaft 10 excepting those in which one of the target areas 18, 20 and 22 is aligned with optical fiber 16. Target areas 18 and 20, being at discrete vertical and horizontal locations on the surface of shaft 10, each represent a discrete translative and rotary position of shaft 10, and target area 22, being located at a discrete vertical location on the surface of shaft 10 and extending substantially around that surface, represents a discrete translative position and range of rotary positions of shaft 10.

As previously discussed, one of the requirements for each target area is that the target area must be well defined in dimension and must have a light reflectivity that is and remains in sharp contrast to that of the target background. Additional requirements for the specific application in FIG. 1 are that each target area must not protrude above the surface of shaft 10 (so as to avoid scoring of closely engaging bearing 12), must be inexpensive to manufacture, and must be relatively unaffected by any dirt or contaminants. All of these requirements are met by having each of the target areas 18, 20 and 22 consist of an angled recess that extends into shaft 10 from its surface and that has a predetermined relationship with optical fiber 16 so that each target area is substantially nonreflective insofar as optical fiber 16 is concerned.

Figure 2:
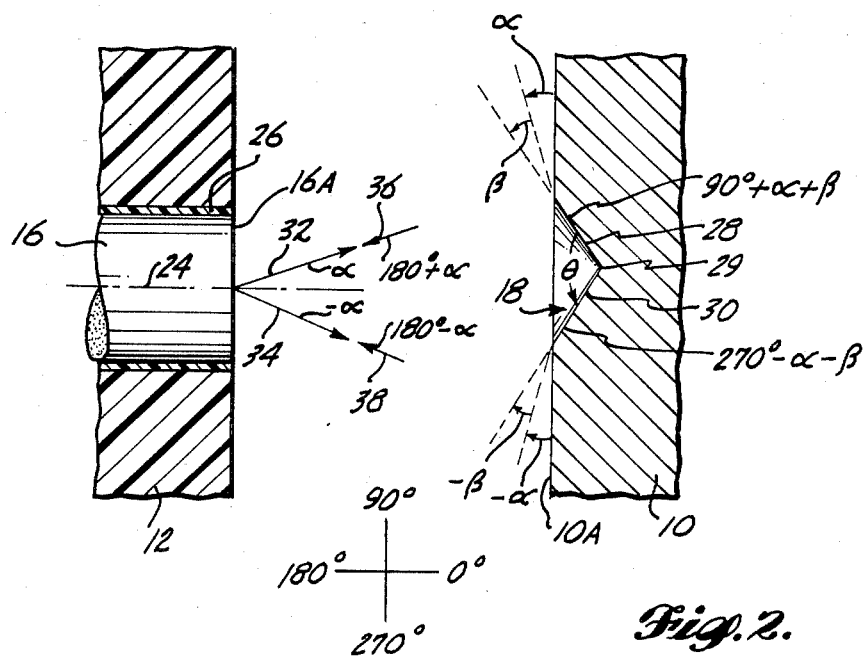
FIG. 2 is a cross-sectional view of the fiber optic sensor of FIG. 1, particularly illustrating the relationship between an optical fiber of the sensor that is supported by the bearing and a target area consisting of a recess that is formed on the shaft and that is substantially nonreflective insofar as the optical fiber is concerned.

Referring now to the cross-sectional view of FIG. 2, optical fiber 16 has an end face 16A that is proximate but slightly separated from surface 10A of shaft 10. Bearing 12 carries optical fiber 16 so that its longitudinal axis 24 is substantially perpendicular to, and its end face 16A is substantially parallel to, surface 10A of shaft 10. Along its length, optical fiber 16 is provided with cladding 26.

Target areas 18 and 20 each consist of a conical recess, whereas target area 22 consists of an elongated groove. Taking target area 18 as an example, the conical recess thereof is defined by an upper recess surface 28 and a lower recess surface 30 meeting at an apex 29, each surface extending into shaft 10 from surface 10A thereof and each equally inclined from that surface. As with surface 10A, surfaces 28 and 30 are highly polished, chrome plated, and thus highly reflective. Notwithstanding the reflectivity of surfaces 28 and 30, the essential task is to arrange those surfaces so that any light exiting optical fiber 16 through end face 16A and received within the conical recess is not returned to optical fiber 16 in a manner so that it can be transmitted along the length of the optical fiber to sensor circuit 14. In analyzing this task, reference will be made to the two-dimensional coordinate system illustrated in FIG. 2 in which the 0°–180° axis is parallel to longitudinal axis 24 of optical fiber 16, the 90°–270° axis is parallel to surface 10A of shaft 10 and end face 16A of optical fiber 16, the 0° position is to the right, and positive angles are measured in a counterclockwise direction.

Optical fiber 16 can be characterized by its numerical aperture A, as follows:

$$A = \sqrt{(\text{fiber refractive index})^2 - (\text{cladding refractive index})^2} \quad (1)$$

This numerical aperture can be expressed in terms of an angle $\alpha$ by the relation $$\alpha = \arcsin A \quad (2)$$

where $\alpha$ is the limiting spherical angle beyond which a light ray cannot exit or enter optical fiber 16 through end face 16A and still be transmitted along the length of the optical fiber without escaping through cladding 26.

In the coordinate system in FIG. 2, this limiting angle is represented by transmitted rays 32 and 34, respectively at angles of $\alpha$ and $-\alpha$ and by corresponding received rays 36 and 38, respectively at angles of $180° + \alpha$ and $180° - \alpha$. Although rays 32, 34, 36 and 38 are illustrated in FIG. 2 with reference to longitudinal axis 24 of optical fiber 16, it should be noted that these angular relationships hold for any line through optical fiber 16 that is parallel to longitudinal axis 24. Simply stated, any light that is transmitted along the length of optical fiber 16 from sensor circuit 14 can exit end face 16A only within the range of $\alpha$ to $-\alpha$, and any light incident upon end face 16A must be in the range of $180° + \alpha$ to $180° - \alpha$ for that light to be transmitted along the length of optical fiber 16 to sensor circuit 14.

If the conical recess of target area 18 has an included angle $\theta$ between any two diametrically-opposed points on its surface, the angle $\theta$ may be represented as the included angle between surfaces 28 and 30. An angle $\beta$ then may be defined to relate the angle $\alpha$ to the included angle $\theta$. As illustrated in FIG. 2, surfaces 28 and 30 are each inclined from surface 10A of shaft 10 by the angle $\alpha$ plus the angle $\beta$. Given the coordinate system and convention previously discussed, it will be seen that surface 28 has the direction $90° + \alpha + \beta$ and surface 30 has the direction $270° - \alpha - \beta$. Therefore, $$\theta = (270° - \alpha - \beta) - (90° + \alpha + \beta) \quad (3)$$

$$\theta = 180° - 2\alpha - 2\beta$$

$$\beta = \frac{1}{2}(180° - \theta - 2\alpha) \quad (4)$$

These relations can be used along with the following analysis to determine the limits on angle $\beta$ (and thus on angle $\theta$) within which substantially no light exiting end face 16A of optical fiber 16 will be reflected by target area 18 so as to be incident on end face 16A with an angle in the range of $180° + \alpha$ to $180° - \alpha$.

Figure 3:
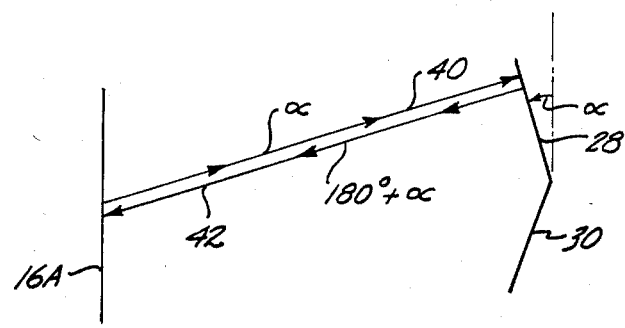
FIGS. 3 and 4 are schematic diagrams respectively illustrating maximum and minimum limits for the included angle of the recess of FIG. 2 that are required for the target area to be substantially nonreflective; and, FIGS. 5 and 6 are cross-sectional views illustrating alternate forms of the recess.

The minimum limit on angle $\beta$ (and the upper limit on angle $\theta$) may be easily recognized as that in which the angle $\beta$ is zero, e.g., that in which both surfaces 28 and 30 are inclined at angle $\alpha$ from surface 10A. It can be shown that a light ray exiting from end face 16A at angle $\alpha$ will result in a light ray that is reflected from surface 28 at an angle $180° + \alpha + 2\beta$. If the angle $\beta$ is zero as illustrated in FIG. 3, light ray 40 at angle $\alpha$ will be perpendicular to surface 28 so that its reflected light ray 42 has the angle $180° + \alpha$ and is therefore incident on end face 16A at one of the limits of the numerical aperture of optical fiber 16 as previously described.

Figure 4:
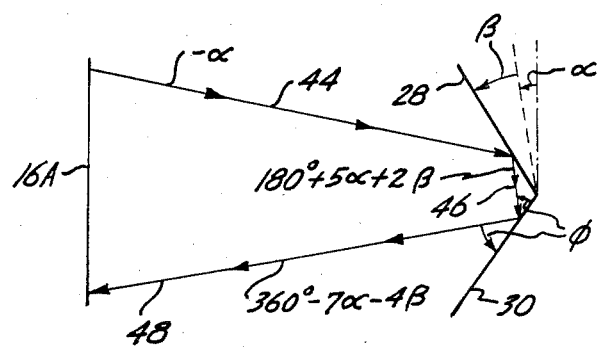

In order to determine the maximum limit on angle $\beta$ (and the minimum limit on angle $\theta$), reference should be made to FIG. 4. A light ray 44 exiting from end face 16A at angle $-\alpha$ is incident upon surface 28, resulting in a first reflected ray 46 that is directed toward and incident upon surface 30, further resulting in a second reflected ray 48 that is directed toward and incident upon end face 16A. Ray 46 will have the angle $180°+5\alpha+2\beta$. The angle $\phi$, measured from surface 30 to first reflected ray 46, is the difference between the angle of ray 46 and the angle of surface 30, or, $$\phi=(180°+5\alpha+2\beta)-(270°-\alpha-\beta)$$

$$\phi=-90°+6\alpha+3\beta \qquad (5)$$

The angle of second reflected ray 48 is then the angle of surface 30, minus the angle $\phi$, or, $$\begin{aligned}\text{second reflected ray} &= (270°-\alpha-\beta)-\phi \qquad (6)\\ &= (270°-\alpha-\beta)-(-90°+6\alpha+3\beta)\\ &= 360°-7\alpha-4\beta\end{aligned}$$

As previously discussed, one of the limits for a ray entering optical fiber 16 through end face 16A is a ray at an angle $180°+\alpha$. By setting this limiting value equal to the angle of second reflected ray 48, the maximum limit on angle $\beta$ may be determined.

$$\begin{aligned}180°+\alpha &= 360°-7\alpha-4\beta \qquad (7)\\ 4\beta &= 180°-8\alpha\\ \beta &= 45°-2\alpha\end{aligned}$$

Therefore, $$0°<\beta<45°-2\alpha \qquad (8)$$

By combining relations (4) and (8), the limits on $\theta$ are $$90°+2\alpha<\theta<180°-2\alpha \qquad (9)$$

From relation (9), it can be appreciated that the range of angle $\theta$ decreases with increases in the angle $\alpha$ of optical fiber 16 and that the midpoint of that range is 135° which is the preferred value for angle $\theta$. From relation (8), it can be appreciated that the angle $\beta$ cannot exist when the angle $\alpha$ equals or exceeds $22-\frac{1}{2}°$. By reference to relation (2), there is accordingly a maximum limit for the numerical aperture A of 0.38 above which some light rays will always return to and be transmitted along the length of optical fiber 16 notwithstanding the included angle $\theta$ of the target area.

It can also be appreciated that the diameter of the conical recess of target area 18, measured at surface 10A of the shaft, is preferably no smaller than the diameter of the optical fiber in order that the conical recess may appear as a nonreflective target area to the optical fiber. If the diameter of the recess were to be less than that of the fiber, some of the rays exiting from the fiber face would be reflected back to the fiber face by the shaft surface and be incident upon the fiber face within the limiting angle defined by the fiber's numerical aperture.

The foregoing analysis with reference to the two-dimensional representation of FIGS. 2-4 is valid for the third dimension of the conical recesses of target areas 18 and 20 wherein surfaces 28 and 30 are included in a conical surface of revolution, and is also valid for the third dimension of the grooved recess of target area 22 wherein surfaces 28 and 30 are respective upper and lower surfaces of the groove. This analysis does not take into consideration, however, the skewed reflected rays that may be encountered with the conical recesses of target areas 18 and 20 and more particularly with the grooved recess of target area 22. In FIGS. 2-4, the plane defined by each reflected ray entering the optical fiber and by the longitudinal axis of the optical fiber is the same as the plane defined by the corresponding ray exiting the optical fiber and by the longitudinal axis of the optical fiber. In the case of skewed reflected rays, the plane defined by the skewed reflected ray and by the longitudinal axis of the optical fiber will differ from the plane defined by the corresponding ray exiting the optical fiber and by the longitudinal axis of the optical fiber. It can be shown, however, that each skewed reflected ray will be incident upon the optical fiber at an angle, measured relative to the longitudinal axis of the optical fiber, that is greater than the limiting angle $\alpha$.

Figure 5:
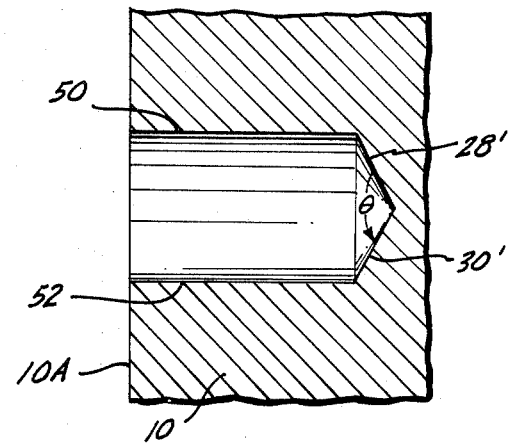

An alternate form of the target area is seen in FIG. 5. The recess of the target area includes opposing surfaces 50 and 52 extending into shaft 10 from surface 10A to respective surfaces 28' and 30' that are constructed and arranged in a manner identical to surfaces 28 and 30 previously described. Provided that surfaces 50 and 52 are each substantially perpendicular to surface 10A, it can be shown that any ray exiting the optical fiber will always be reflected back to the optical fiber so as to be incident thereon at an angle greater than angle $\alpha$, even though the exiting ray may reflect off both surfaces 50 and 52 before returning to the optical fiber. Surfaces 28' and 30' may be included in a conical surface, in which case surfaces 50 and 52 would be included in a corresponding cylindrical surface, or, surfaces 28' and 30' may be corresponding surfaces of a groove, in which case surfaces 50 and 52 would be corresponding upper and lower, planar surfaces of the groove.

Figure 6:
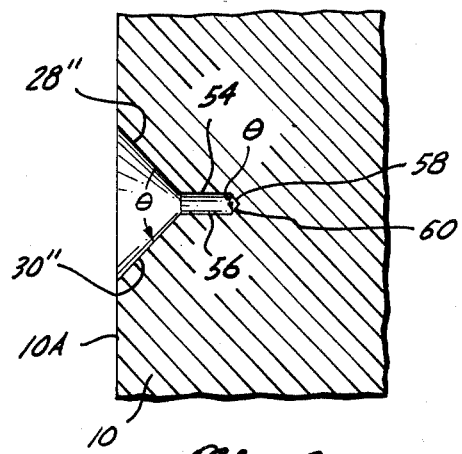

The alternate form illustrated in FIG. 6 also may be used. The recess includes surfaces 28'' and 30'' extending into shaft 10 from surface 10A and constructed and arranged in a manner identical to that of surfaces 28 and 30 previously described. Opposing surfaces 54 and 56 extend from surfaces 28'' and 30'' to surfaces 58 and 60 which are also constructed and arranged in a manner identical to that of surfaces 28 and 30. Those skilled in the art will appreciate that surfaces 54, 56, 58 and 60 function in a manner identical to the corresponding surfaces of the form of recess in FIG. 5. Surfaces 58 and 60 may be included in a conical surface, in which case surfaces 54 and 56 would be included in a corresponding cylindrical surface, or, surfaces 58 and 60 may be the surfaces of a groove, in which case surfaces 54 and 56 would be corresponding upper and lower, planar surfaces of the groove.

Although the recess has been described as being substantially nonreflective, it is in practice not totally nonreflective. Some of the transmitted light will be reflected back to the fiber by imperfections in the recess surfaces and by apex 29 (reference FIG. 2) which cannot in practice consist of a true dimensionless point. The portion of transmitted light that is reflected back to the fiber and transmitted along the fiber, however, will be less than 1%. A portion of the light transmitted along the length of the fiber from the sensor circuit will also be reflected back along that length due to the Fresnel reflection at interface existing at end face 16A; however, this portion will remain constant notwithstanding the position of shaft 10.

From the foregoing description, it will be seen that the fiber optic sensor provides a well defined target area that is substantially nonreflective insofar as the optical fiber is concerned. Each target area may be easily and inexpensively manufactured by drilling, machining, coining or etching, and the surfaces thereof require no special treatment and may in fact be highly reflective. In the specific application that has been discussed, each target area is recessed into the shaft so as to not score or otherwise damage the bearing supporting the shaft, and dirt and other contaminants that may in time enter and reside in each target area will in general absorb light and therefore not adversely affect the target area reflectivity.

While the invention has been described with reference to a preferred embodiment and to a specific application, it is to be clearly understood by those skilled in the art that the invention is not limited thereto and the scope by the invention is to be interpreted only in conjunction with the appended claims.

The embodiments of the invention in which an exclusive property or privilege is claimed are defined as follows:

1. A fiber optic sensor for determining the position of an object, said sensor comprising:
   an elongated optical fiber having an end face, said optical fiber being characterized by a limiting angle $\alpha$ measured relative to the longitudinal axis of said optical fiber beyond which a light ray cannot exit or enter said end face and still be transmitted along the length of said optical fiber;
   an object surface on the object that remains substantially perpendicular to the longitudinal axis of said optical fiber, said object surface being reflective; and,
   a nonreflective target area located on the object surface so as to contrast therewith and correspond to a position of the object to be determined, said target area consisting of a recess extending into the object from said object surface, said recess including first and second, opposing surfaces that are substantially equally inclined from said object surface and that have an included angle $\theta$ measured between any two diametrically-opposed points thereon, where $90° + 2\alpha < \theta < 180° - 2\alpha$.

2. The sensor of claim 1, wherein said included angle $\theta$ is substantially 135°.

3. The sensor of claim 1, wherein said limiting angle $\alpha$ is less than 22.5°.

4. The sensor of claim 1, wherein said first and second, opposing surfaces are included in a conical surface of said recess, all portions of said conical surface being substantially equally inclined from said object surface.

5. The sensor of claim 4, wherein said conical surface terminates in a central apex.

6. The sensor of claim 4, wherein said recess further includes a substantially cylindrical surface extending from said object surface to said conical surface, said cylindrical surface being substantially perpendicular to said object surface.

7. The sensor of claim 4, wherein said conical surface extends into said object from said object surface.

8. The sensor of claim 7, wherein said recess further includes: a second conical surface, all portions of which are substantially equally inclined from said object surface, said second conical surface having said included angle $\theta$ between any two diametrically-opposed points thereon; and,
   a substantially cylindrical surface extending from said conical surface to said second conical surface, said cylindrical surface being substantially perpendicular to said object surface.

9. The sensor of claim 1, wherein said first and second surfaces are highly reflective.

10. The sensor of claim 1, wherein the maximum distance between any two diametrically-opposed points on said first and second surfaces is no less than the diameter of said optical fiber.

11. The sensor of claim 1, wherein said recess further includes a third surface extending from said object surface to said first surface and a fourth surface opposing said third surface and extending from said object surface to said second surface, said third and said fourth surfaces being each substantially perpendicular to said object surface.

12. The sensor of claim 1, wherein said first and said second surfaces extend into said object from said object surface.

13. The sensor of claim 12, wherein said recess further includes: third and fourth, opposing surfaces that are substantially equally inclined from said object surface and that have said included angle $\theta$ between any two diametrically-opposed points thereon: a fifth surface extending from said first surface to said third surface and a sixth surface opposing said fifth surface and extending from said second surface to said fourth surface, said fifth and sixth surfaces being each substantially perpendicular to said object surface.

14. A fiber optic sensor for determining the position of an object, said sensor comprising:
   an elongated optical fiber having an end face, said optical fiber being characterized by a limiting angle $\alpha$ measured relative to the longitudinal axis of said optical fiber beyond which a light ray cannot exit or enter said end face and still be transmitted along the length of said optical fiber;
   a reflective surface on the object; and
   a nonreflective target area located on the reflective surface so as to contrast therewith and correspond to a position of the object to be determined, said target area consisting of a recess extending into the object from said reflective surface, said recess including first and second opposing surfaces that are substantially equally inclined by an angle $\theta/2$ from an axis that remains parallel to the longitudinal axis of said optical fiber, where $90° + 2\alpha < \theta < 180° - 2\alpha$.

15. A fiber optic sensor for detecting the position of an object, said sensor comprising:
   an elongated optical fiber having an end face, said optical fiber being characterized by a limiting angle $\alpha$ measured relative to the longitudinal axis of said optical fiber beyond which a light ray cannot exit or enter said end face and still be transmitted along the length of said optical fiber;
   a reflective surface on the object; and,
   a nonreflective target area located on the reflective surface so as to contrast therewith and correspond to a position of the object to be determined, said target area consisting of a recess extending into the object from said reflective surface, said recess being constructed and arranged so that a light ray exiting the end face of said optical fiber and incident upon said recess is reflected at an angle greater than the limiting angle $\alpha$ of said optical fiber and thereby prevented from entering said end face.

16. The sensor of claim 15, wherein said recess has at least one angled surface that is inclined relative to said reflective surface at an angle $\theta/2$ measured from an axis that remains parallel to the longitudinal axis of said optical fiber, where $90° + 2\alpha < \theta < 180° - 2\alpha$.

* * * * *

UNITED STATES PATENT AND TRADEMARK OFFICE
CERTIFICATE OF CORRECTION

PATENT NO. : 4,547,665

DATED : October 15, 1985

INVENTOR(S) : Little et al.

It is certified that error appears in the above-identified patent and that said Letters Patent is hereby corrected as shown below:

Title page:

Abstract, line 12, insert --be-- before "substantially"
Column 6, line 30, "a" should be --α--
Column 7, line 21, "by" should be --of--

Signed and Sealed this

Fourteenth Day of January 1986

[SEAL]

Attest:

*Attesting Officer*

DONALD J. QUIGG

*Commissioner of Patents and Trademarks*